US012574428B2

(12) United States Patent
Klabunde et al.

(10) Patent No.: US 12,574,428 B2
(45) Date of Patent: Mar. 10, 2026

(54) DYNAMIC MODIFICATION OF FUNCTIONALITY OF A REAL-TIME COMMUNICATIONS SESSION

(71) Applicant: KONINKLIJKE PHILIPS N.V., Eindhoven (NL)

(72) Inventors: Karin Klabunde, Bochum (DE); Zoran Stankovic, Eindhoven (NL); Arjan Michiel Draisma, Eindhoven (NL); Marcel Johannes Quist, Veldhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

(21) Appl. No.: 17/617,029

(22) PCT Filed: Jun. 10, 2020

(86) PCT No.: PCT/EP2020/066143
§ 371 (c)(1),
(2) Date: Dec. 7, 2021

(87) PCT Pub. No.: WO2020/249645
PCT Pub. Date: Dec. 17, 2020

(65) Prior Publication Data
US 2022/0321633 A1 Oct. 6, 2022

Related U.S. Application Data

(60) Provisional application No. 62/860,503, filed on Jun. 12, 2019.

(30) Foreign Application Priority Data

Nov. 8, 2019 (EP) ...................................... 19208079
May 26, 2020 (NL) ...................................... 2025686

(51) Int. Cl.
H04L 65/1093 (2022.01)
H04L 65/1096 (2022.01)
(Continued)

(52) U.S. Cl.
CPC .......... *H04L 65/65* (2022.05); *H04L 65/1093* (2013.01); *H04L 65/1096* (2013.01);
(Continued)

(58) Field of Classification Search
CPC . H04L 65/65; H04L 65/1093; H04L 65/1096; H04L 65/4038; H04L 65/4046;
(Continued)

(56) References Cited

U.S. PATENT DOCUMENTS

| | | | |
|---|---|---|---|
| 5,195,086 A | 3/1993 | Baumgartner | |
| 6,314,556 B1 | 11/2001 | DeBusk | |

(Continued)

FOREIGN PATENT DOCUMENTS

| | | | |
|---|---|---|---|
| JP | 2001217959 A | 8/2001 | |
| JP | 2011039860 A | 2/2011 | |

(Continued)

OTHER PUBLICATIONS

International Search Report and Written Opinion, International Application No. PCT/EP2020/066143, Mailed on Sep. 14, 2020.

*Primary Examiner* — William G Trost, IV
*Assistant Examiner* — Adam A Cooney

(57) ABSTRACT

Presented are approaches for dynamic modification of the functionality of a RTC session including one or more data streams between participants to the real-time communication session (100). Embodiments of the present invention are therefore directed toward enabling the functionality of a RTC system to be modified, extended and/or improved while it is implementing a RTC session. Exemplary embodiments include: identifying a request for a first algorithm
(Continued)

(A1) of a set of algorithms (A1, A2, A3); and dynamically modifying the functionality of the real-time communications session by adding the first algorithm (A1) to the real-time communication session (100) as a virtual participant employing at least one data stream out of the one or more data streams.

15 Claims, 12 Drawing Sheets

(51) Int. Cl.

| | |
|---|---|
| *H04L 65/403* | (2022.01) |
| *H04L 65/4038* | (2022.01) |
| *H04L 65/4053* | (2022.01) |
| *H04L 65/65* | (2022.01) |
| *H04L 65/75* | (2022.01) |
| *H04L 67/02* | (2022.01) |

(52) U.S. Cl.
CPC ...... *H04L 65/4038* (2013.01); *H04L 65/4046* (2013.01); *H04L 65/4053* (2013.01); *H04L 65/765* (2022.05); *H04L 67/02* (2013.01)

(58) Field of Classification Search
CPC ... H04L 65/4053; H04L 65/765; H04L 67/02; H04L 65/403
See application file for complete search history.

(56) References Cited

U.S. PATENT DOCUMENTS

| | | | | |
|---|---|---|---|---|
| 8,605,132 | B1 * | 12/2013 | Swanson | H04N 7/155 |
| | | | | 370/260 |
| 10,424,297 | B1 * | 9/2019 | Carino | G10L 25/78 |
| 11,188,676 | B2 | 11/2021 | Sellberg | |
| 2007/0294263 | A1 | 12/2007 | Punj | |
| 2010/0329140 | A1 * | 12/2010 | Buford | H04M 3/4217 |
| | | | | 709/224 |
| 2011/0271210 | A1 | 11/2011 | Jones | |
| 2013/0293666 | A1 * | 11/2013 | Jiang | H04L 65/4038 |
| | | | | 348/14.08 |
| 2014/0164187 | A1 * | 6/2014 | Dietz | G06Q 30/0625 |
| | | | | 705/26.62 |
| 2015/0002619 | A1 * | 1/2015 | Johnston | H04L 65/1069 |
| | | | | 348/14.12 |
| 2015/0121250 | A1 * | 4/2015 | Waxman | G06F 3/0482 |
| | | | | 715/753 |
| 2015/0381674 | A1 * | 12/2015 | Klemm | H04L 67/141 |
| | | | | 709/203 |
| 2016/0156615 | A1 * | 6/2016 | Arai | H04L 12/1818 |
| | | | | 726/4 |
| 2016/0227161 | A1 * | 8/2016 | Jing | H04L 65/1046 |
| 2017/0026516 | A1 * | 1/2017 | Westlake | H04M 3/5183 |
| 2017/0102902 | A1 * | 4/2017 | Ohishi | G06F 3/1204 |
| 2017/0178234 | A1 * | 6/2017 | Jezek, Jr. | G06Q 40/04 |
| 2017/0195392 | A1 * | 7/2017 | Elad | H04L 65/1073 |
| 2017/0310713 | A1 * | 10/2017 | Jayapal | H04M 3/42119 |
| 2018/0183850 | A1 * | 6/2018 | Lacharme | H04L 41/12 |
| 2018/0262404 | A1 * | 9/2018 | Su | H04L 67/02 |
| 2019/0013038 | A1 * | 1/2019 | Thomson | G06F 40/20 |
| 2019/0245886 | A1 * | 8/2019 | Johns | H04L 63/1466 |
| 2020/0279658 | A1 * | 9/2020 | Rao | G16H 80/00 |

FOREIGN PATENT DOCUMENTS

| | | |
|---|---|---|
| JP | 2018156608 A | 10/2018 |
| WO | 2019070822 A1 | 4/2019 |

* cited by examiner

DYNAMIC MODIFICATION OF FUNCTIONALITY OF A REAL-TIME COMMUNICATIONS SESSION

CROSS-REFERENCE TO PRIOR APPLICATIONS

This application is the U.S. National Phase application under 35 U.S.C. § 371 of International Application No. PCT/EP2020/066143, filed on 10 Jun. 2020, which claims the benefit of U.S. Provisional Patent Application No. 62/860,503, filed on 12 Jun. 2019, European Patent Application No. 19208079.4, filed on 8 Nov. 2019 and Dutch Patent Application No. 2025686, filed on 26 May 2020. These applications are hereby incorporated by reference herein.

FIELD OF THE INVENTION

This invention relates to the field of Real-Time Communications (RTC) and more particularly to functionality of a RTC session.

BACKGROUND OF THE INVENTION

US 2015/002619 discloses scalable Web Real-Time Communication (WebRTC) media engines, and related methods, systems, and computer-readable media.

WO 2019/070822 discloses collaboration via chat in health care systems.

Real-Time Communications (RTC) is the near-simultaneous exchange of information over any type of telecommunications service from the sender to the receiver in a connection with negligible latency. Examples of RTC typically employ real-time data streams (e.g. video, voice and/or data streams) and include: voice over landlines and mobile phones; VoIP; Video and teleconferencing; chat; and Robotic telepresence. Accordingly, RTC does not include email, bulletin boards, messaging applications, blogs or other forms of internet communication where users read stored content, which can create a significant delay between data transmission and reception. RTC is typically not stored in an interim state anywhere between the transmitter and the receiver. Within that context, "real time communications" may be thought of as a synonym for "live communications."

Numerous products, systems and applications are known for facilitating RTC sessions. The functionality provided by these may vary widely. However, for each product/system/application, the functionality provided is static (i.e. cannot be modified) and defined (e.g. hard-coded) as part of its configuration. For instance, available functions are available from the beginning of a RTC session and will remain available (either used or un-used) until the end of the RTC session.

SUMMARY OF THE INVENTION

It is, inter alia, an object of the invention to provide an improved system and method for dynamic modification of functionality of a real-time communications session. The invention is defined by the independent claims. The dependent claims define advantageous embodiments.

Generally, in one aspect, the invention focuses on a method for dynamic modification of functionality of a real-time communications session, including establishing a real-time communication session; identifying a request for a first algorithm of a set of algorithms, each algorithm of the set of algorithms being configured to provide an associated functionality when executed during a real-time communication session; and adding the first algorithm to the real-time communication session as a virtual participant.

Proposed embodiments provide concepts for modifying the functionality of a RTC session. For instance, embodiments may be used to integrate new or additional algorithms into a (running) RTC session. Such algorithms may for example comprise newly-developed algorithms for analyzing audio/video/text/data-related data streams that could be useful additions in the course of RTC. Embodiments may thus help to provide improved or extended functionality to existing RTC implementations.

In particular, in one approach disclosed herein, an algorithm is added to a RTC session as a new (virtual) participant of the RTC session. By being added as a (virtual) participant, such an algorithm may be exposed to all data streams of the RTC session. As a participant to the RTC session, the algorithm may then be configured to employ one or more of the real-time data streams.

By way of example, proposed embodiments may enable the dynamic selection of an algorithm of a larger set, and the selected algorithm may then be applied to one or more data streams of a RTC session. Unlike conventional RTC approaches which require algorithms/functionality to be included in the system/application prior to establishing a RTC session, the proposed concepts facilitate modification (e.g. addition, removal, changing) of algorithms/functionality of a RTC session during the RTC session. Simple integration and dynamic use of existing and/or new algorithms during a RTC session (e.g. conference call) may therefore be achieved by proposed embodiments.

Typically, the functionality available during conventional RTC sessions is determined by system configuration and thus fixed. Such conventional RTC sessions cannot therefore add new functionality (e.g. new or improved algorithms for processing audio/video/data) during the RTC session as needed. Proposed embodiments, on the other hand, may provide the ability to easily extend a RTC session with new or different algorithms that process any or all of the data streams (e.g. audio/video/data streams) that are exchanged between participants of RTC session. The proposed concept(s) may also allow the definition and/or control of which data stream(s) from which participant(s) may be processed by which algorithm(s). Further, the proposed concept(s) may allow the definition and/or control of which participant(s) will be provided with results/outputs from the new or different algorithms.

By way of example, proposed embodiments may implement a wrapper (e.g. which might use a public Application Programming Interface, API) that facilitates the incorporation of an independently-developed algorithm into a RTC session. In this way, newly-developed and/or newly-available algorithms may be integrated into a RTC session via the API. Further, embodiments may provide a component for hosting a set of such algorithms (e.g. a container), a component for selecting from these algorithms (e.g. REST-API or messaging services), and a component for incorporating these algorithms into a RTC session may also be provided (e.g. Headless Client).

Embodiments may leverage the idea of using a wrapper that allows the configuration and deployment of independent algorithms. Also, embodiments provide a high degree of flexibility by facilitating the ability to add/remove an algorithm to/from a RTC session at runtime (i.e. during the RTC session, rather than before the RTC session). Proposed concepts may therefore provide for the dynamic application of algorithms to data streams during an established RTC session.

By way of further example, the dynamic nature of functionality modification provided by proposed embodiments may be facilitated via:

(i) triggering an algorithm at a specific period of time, defined by the context (workflow type) of the data stream. In this case, the trigger may be a manual trigger provided by an administrator (physician), an automatic trigger (e.g. time-scheduled, dependent on process step), and/or a context-sensitive trigger (e.g. dependent on result on a previous measurement done by another algorithm); and (ii) triggering an algorithm arranged to work with a specific data type (once it is part of the data stream). This may specify which of the streams available in a RTC session should be processed by the algorithm that is added to the conference. For instance, when an algorithm is added to a RTC session as a participant, it can be selected which of the available streams of which participant shall be processed, e.g. Algorithm 1 may be configured to process audio from participant 2, whereas Algorithm 2 may be configured to process audio and video from participant 3.

Embodiments may increase a value of RTC by enabling the modification of RTC session functionality in a dynamic manner, and this may for example account for a specific (e.g. selected, chosen or current) clinical context. Embodiments may therefore increase the clinical value of a RTC session by employing contextual information to provided modified and/or extended functionality.

In some embodiments, the process of adding the first algorithm to the real-time communication session as a virtual participant may comprise: calling the first algorithm via a container; and configuring, by the container, the first algorithm as a virtual participant of the real-time communication session. The configuring may be implemented in real-time, thus enabling dynamic and real-time adjustment of a RTC session's functionality. This may allow the definition and control of what (which streams or participants) the first algorithm is applied to and where (to which streams and participants) the results of the algorithm(s) should be communicated. The container may thus be configured to process commands and control the addition of an algorithm as a participant. The container may, for example, be connected to the real-time system, and may receive commands for dynamically adding/removing algorithms during a multi-party RTC session. The container may thus act as a transport layer (transporting the streams of the participants to the algorithms and vice versa).

In an embodiment, the request for a first algorithm may comprise an indication of a requirement of the first algorithm. Adding the first algorithm to the real-time communication session as a virtual participant may then comprise: configuring at least one of: an input; an output of the first algorithm based on the indication of a requirement of the first algorithm. This may provide a way to specify which of the streams available in a RTC session should be processed by the first algorithm. By way of example, a wrapper may be associated with independently-developed algorithm(s) to make it possible to use them with the RTC session. Data compatibility may there be ensured by proposed embodiments.

For example, in an embodiment, each algorithm of the set of algorithms may be associated with a respective wrapper defining at least one of: an input; an output; and a requirement of the algorithm. Adding the first algorithm to the real-time communication session as a virtual participant may then comprise: configuring at least one of: an input; an output of the first algorithm based on the wrapper associated with the first algorithm.

Identifying a request may comprise determining a request for a first algorithm based on at least one of: a user input signal provided by a participant of the real-time communication session (e.g. input in chat function); a context of a data stream of the real-time communication session; the occurrence of a predetermined trigger event; and un-predetermined trigger (e.g. button press on Application UI).

Embodiments may further comprise the step of removing the first algorithm as a virtual participant of the real-time communication session.

In some embodiments, the first algorithm may be configured to generate a request for a second algorithm of the set of algorithms when executed during a real-time communication session. In this way, a first algorithm added to a RTC session may be used to trigger the addition of a further, second algorithm to the RTC session.

A participant of the RTC session may comprise a medical professional. The real-time communication session may be configured for exchange of clinical information for Clinical Decision Support.

By way of further example, at least one algorithm of the set of algorithms may be configured to store and/or retrieve data to/from an electronic medical record database when executed.

It is also proposed that the concept(s) for modifying the functionality of a RTC session may be leveraged to supplement a face-to-face interaction wherein participants are in the same location. In this way, additional functionality may be added to a live, in-person interaction between two participants for example.

For instance, where two participants are partaking in an interaction at the same location (e.g. within a room, at a meeting place, at the same geographic location, etc.), the interaction may be thought of as being a face-to-face (or in-person) interaction, because the participants in are in the physical presence of each other and each participant is able to communicate with the other without any mediating technology. It has been realized that such face-to-face interactions may be supplemented by creating a RTC session (e.g. a virtual RTC session) to accompany the face-to-face interaction, The RTC session may then employ the proposed concept(s) to integrate new or additional algorithms into the RTC session, and these new or additional algorithms may be used to improve or extend functionality for the face-to-face interaction.

By way of example, the face-to-face interaction may comprise a medical professional (as a first participant) and a subject (as a second participant) and take place within a medical consultation room. A system according to a proposed embodiment may be provided in the medical consultation room so as to implement a RTC session that accompanies the face-to-face interaction, and, in response to identifying a request for an algorithm with associated functionality, the first algorithm may be added to the RTC session as a virtual participant thereby providing its associated functionality. For instance, the system may include: a first device associated with the medical professional for processing audio/video/text/data from and/or to the medical professional; and a second device associated with the subject for processing audio/video/text/data from and/or to the subject. The first and second devices may connect to the RTC session (i.e. be participants of the RTC session) and thus be used to provide a request for an algorithm. In this way, the medical professional may request the provision of a functionality via the first device (e.g. by speech, via a gesture, via an input/selection, etc.), and the subject may provide data for processing by the function via the second device (e.g. via a sensor, microphone, input device, etc.). Functionality that assists a face-to-face medical consultation, for example by undertaking automated tests and/or providing diagnosis assistance, may be provided by proposed embodiments.

Embodiments may be used to integrate new or additional algorithms into a RTC session that accompanies a face-to-face interaction (e.g. meeting or physician-subject consultation). Such algorithms may for example comprise newly-developed algorithms for analyzing audio/video/text/data that could be useful additions to the face-to-face interaction/meeting. Embodiments may thus help to provide improved or extended functionality to a face-to-face interaction/meeting via an accompanying RTC implementation.

By way of example, proposed embodiments may enable the dynamic selection of an algorithm, and the selected algorithm may then be applied to one or more data streams provided by participants of a face-to-face meeting. Such proposed embodiments may facilitate modification (e.g. addition, removal, changing) of algorithms/functionality available to participants of a face-to-face meeting. Simple integration and dynamic use of existing and/or new algorithms during a face-to-face interaction may therefore be achieved by proposed embodiments.

Proposed embodiments may provide the ability to easily extend a face-to-face interaction with new or different algorithms that process any or all of the data streams (e.g. audio/video/data streams) that are exchanged between participants of face-to-face interaction. The proposed concept(s) may also allow the definition and/or control of which data stream(s) from which participant(s) may be processed by which algorithm(s). Further, the proposed concept(s) may allow the definition and/or control of which participant(s) will be provided with results/outputs from the new or different algorithms.

Embodiments may leverage the idea of implementing a RTC session to accompany a face-to-face interaction and then using proposed embodiments to add/remove an algorithm to/from a RTC session at runtime. Proposed concepts may therefore provide for the dynamic application of algorithms to data streams during a face-to-face interaction via an accompanying RTC session.

By way of further example, the dynamic nature of functionality modification provided by proposed embodiments may be facilitated via triggering an algorithm. The trigger may be a manual trigger provided by an administrator (e.g. physician), an automatic trigger (e.g. dependent on process step, detected instructions, sensed values, etc.), and/or a context-sensitive trigger (e.g. dependent on result on a previous measurement done by another algorithm).

Embodiments may increase a value of a face-to-face interaction by enabling the modification of functionality of an accompanying RTC session in a dynamic manner, and this may for example account for a specific (e.g. selected, chosen or current) context. Where the face-to-face interaction has a clinical context (e.g. a physician-subject consultation), embodiments may increase the clinical value of the interaction by establishing a RTC session to accompany the face-to-face interaction and then employing contextual information to provide modified and/or extended functionality via the RTC session.

Accordingly, there may be provided a method for dynamic modification of functionality of a face-to-face interaction between first and second participants, including modifying a functionality of the real-time communication session according to a proposed embodiment, wherein the real-time communication session is established for providing at least one functionality to a participant of the face-to-face interaction. For instance, such a proposed method may include: establishing a real-time communication session for providing at least one functionality to a participant of the face-to-face interaction; identifying a request for a first algorithm of a set of algorithms, each algorithm of the set of algorithms being configured to provide an associated functionality when executed during a real-time communication session; and adding the first algorithm to the real-time communication session as a virtual participant.

According to another aspect, there is provided a computer program product for dynamic modification of functionality of a real-time communications session, wherein the computer program product comprises a computer-readable storage medium having computer-readable program code embodied therewith, the computer-readable program code configured to perform all of the steps of a proposed embodiment.

There is also provided a computer program product for dynamic modification of functionality of a face-to-face interaction between first and second participants, wherein the computer program product comprises a computer-readable storage medium having computer-readable program code embodied therewith, the computer-readable program code configured to perform all of the steps of a proposed embodiment.

Thus, there is also provided a computer system comprising: a computer program product according to proposed embodiment; and one or more processors adapted to perform a method according to a proposed concept by execution of the computer-readable program code of said computer program product.

According to still another aspect of the invention, there is provided a system for dynamic modification of functionality of a real-time communications session, the system comprising: a communication component configured to establish a real-time communication session; a processing component configured to identify a request for a first algorithm of a set of algorithms, each algorithm of the set of algorithms being configured to provide an associated functionality when executed during a real-time communication session; and a modification component configured to add the first algorithm to the real-time communication session as a virtual participant.

The system may be remotely located from a user device for participating in a RTC session. In this way, a user (such as a medical professional) may have an appropriately arranged system that can receive content/information at a location remotely located from the system for dynamic modification of functionality of a RTC session. Embodiments may therefore enable a user to dynamically modify functionality of a RTC session using a local system (which may, for example, comprise a portable display device, such as a laptop, tablet computer, mobile phone, PDA, etc.). By way of example, embodiments may provide an application for a mobile computing device, and the application may be executed and/or controlled by a user of the mobile computing device.

The system may further include: a server device comprising the system for dynamic modification of functionality of a RTC session; and a client device comprising a user-interface. Dedicated data processing means may therefore be employed for the purpose of modifying functionality of a RTC session, thus reducing processing requirements or capabilities of other components or devices of the system.

The system may further include a client device, wherein the client device comprises the processing component, modification component and a display unit. In other words, a user (such as a doctor or medical professional) may have an appropriately arranged client device (such as a laptop, tablet computer, mobile phone, PDA, etc.) which processes received data in order to modify functionality of a RTC session and generate a display control signal. Purely by way of example, embodiments may therefore provide a monitoring or observation system that enables monitoring of one or more subjects (e.g. patients) from a single location, wherein real-time communication between a subject and monitoring user (e.g. nurse or doctor) is provided and can have its functionality extended or modified according to proposed concepts, for example.

There is also provided a system for dynamic modification of functionality of a face-to-face interaction between first and second participants, wherein the system comprises a system for dynamic modification of functionality of a real-time communications session according to a proposed embodiment.

It will be understood that processing capabilities may therefore be distributed throughout the system in different ways according to predetermined constraints and/or availability of processing resources.

These and other aspects of the invention will be apparent from and elucidated with reference to the embodiment(s) described hereinafter.

BRIEF DESCRIPTION OF THE DRAWINGS

Examples in accordance with aspects of the invention will now be described in detail with reference to the accompanying schematic drawings, in which.

DETAILED DESCRIPTION OF THE EMBODIMENTS

Figure 1:
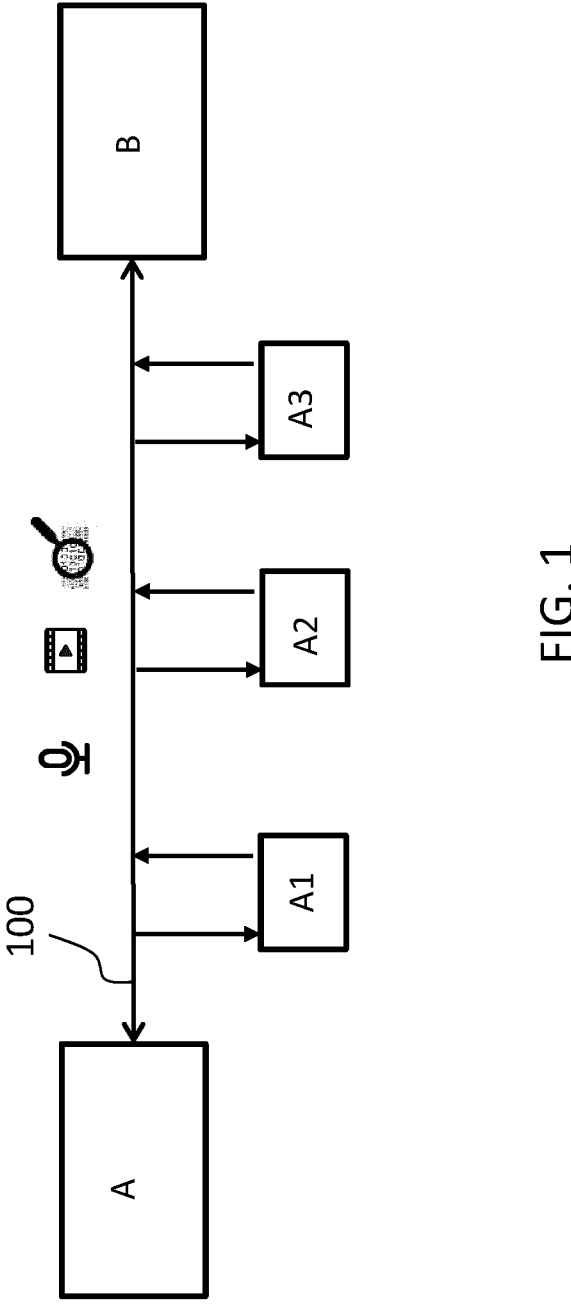
FIG. 1 is a simplified diagram of a RTC session according to an exemplary embodiment.

Proposed is an approach for enabling the dynamic modification of the functionality of a RTC session. Embodiments may add an algorithm to a RTC session as a virtual participant.

Such proposals may thus facilitate simple and intuitive addition, removal or modification of functionality of a RTC session, and this may for example be done in consideration of a context of the RTC session.

Embodiments of the present invention are therefore directed toward enabling the functionality of a RTC system to be modified, extended and/or improved while it is implementing a RTC session. Further, embodiments may be aimed at enabling the provision of relevant or important functionality at appropriate timing during a RTC session. Embodiments may therefore assist in clinical support assessment, medical diagnosis and/or support planning for example.

Also, embodiments may be leveraged in combination with a face-to-face interaction so as to provide supplementary functionalities to one or more participants of the face-to-face interaction.

By way of example only, illustrative embodiments may be utilized in many different types of clinical, medical or subject-related environments, such as a hospital, doctor's office, ward, care home, person's home, etc.

In order to provide a context for the description of elements and functionality of the illustrative embodiments, the Figures are provided hereafter as examples of how aspects of the illustrative embodiments may be implemented. It should therefore be appreciated the Figures are only examples and are not intended to assert or imply any limitation with regard to the environments, systems or methods in which aspects or embodiments of the present invention may be implemented.

It is noted that many algorithms for processing of audio/video/data/text already exist, but that this may not be facilitated in (or provided by) existing RTC systems. Since such RTC system are already defined, their functionality can only be changed (e.g. to incorporate such algorithms) by being redefined (e.g. reprogrammed) and redistributed prior to establishing new RTC session.

It is proposed to provide one or more concepts that enable the modification (e.g. addition, removal, reconfiguration, etc.) of a RTC system's functionality during a RTC session (i.e. while the system is implementing a RTC session). In particular, embodiments may facilitate the addition, removal or modification of an algorithm to/from/of a RTC session by adding or removing the algorithm as a participant of the RTC session. Embodiments may also allow the definition and/or control of which participants an output from the algorithm will be provided to.

Current algorithms are specifically-implemented 'services' of a RTC system and cannot be subsequently added or removed by the RTC system during a RTC session. Specific algorithms therefore have to be included at programming time of the RTC system.

Proposed embodiments, on the other hand, may implement a wrapper (e.g. using a public API) that makes it easy to add an independently-developed algorithm to a RTC session. As a result, algorithms found on internet and/or newly-developed algorithms may be easily integrated to a RTC session by being called and added as a participant of the RTC session.

The dynamic nature of embodiments may be realized in various manners, such as (a) triggering an algorithm at a specific period of time; (b) triggering an algorithm arranged to work with a specific data type.

(a) Triggering an algorithm at a specific period of time, defined by the context (workflow type) of the data stream.

In this case, it can be either a manual trigger by an administrator (e.g. a physician), an automatic trigger (e.g. time-scheduled, dependent on process step) or context-sensitive trigger. For example, in telemedicine, a physician usually knows in advance the type of conference calls he/she will be conducting (e.g. patient intake, discussion of test results, assessing progress of therapy, etc.). In each of these exams, the administrator typically follows a predefined set of steps, which might be linked to a specific algorithm the system might offer to run. Embodiments may offer a "context sensitive" menu to the administrator (e.g. physician) based on the exam selection. Embodiments may track exam's progression in time and change the menu selection depending on the elapsed time.

By way of example, FIG. 1 is a simplified illustration of a RTC session having first A and second B participants. More specifically, the RTC session is a physician-patient consultation wherein the first participant A is a physician and the second participant B is a patient. A duplex communication link 100 between the first A and second B participants communicates audio, video and data streams (as depicted by the symbols in FIG. 1).

First A1, second A2 and third A3 algorithms are available for use. Specifically, the first algorithm A1 is configured to undertake authentication of the patient B when executed. The second algorithm A2 is configured to measure respiration rate of the patient B when executed. The third algorithm A3 is configured to capture an image (i.e. take a photo) of the patient B when executed.

The physician A begins a video consultation with the patient B and selects the type of consultation to be a 'discussion of lab results'. The RTC application (automatically) triggers the first algorithm A1 to undertake authentication of the patient B at the start of the consultation. After successful authentication, the physician A starts the discussion of the lab results and, to check a result, a measurement of respiration rate is required. The physician therefore (explicitly) requests execution of the second algorithm A2 to measure respiration rate of the patient B, and the measured respiration rate is provided to the physician A. Because the measured respiration rate exceeds a predetermined threshold value, the third algorithm A3 is (automatically) executed to capture an image (i.e. take a photo) of the patient B. In this way, execution of the third algorithm A3 may be thought of as being context-sensitive.

(b) Triggering an algorithm arranged to work with a specific data type (once it is part of the data stream).

Embodiments may offer the capability to specify which of the data streams available in a RTC session should be processed by an algorithm added to the RTC session. A wrapper may be associated to independently-developed algorithm(s) so as to make it possible to use them with a RTC solution.

Data compatibility may be ensured by embodiments using such a wrapper. For example, an existing RTC solution may use the following standards by default: VP8 for video, OPUS for audio, and text in JSON format for data. These standards are used by most meeting systems and existing algorithms. Only for video streams there might be exceptions that use H.262/H.264 (e.g. IOS based solutions). H.264 is also a widely known video format, and is also supported. Thus, data compatibility may be ensured by proposed embodiments.

When an algorithm is added to a RTC session, it can be selected which of the available streams of which participant shall be processed.

Also, the system may detect connection quality/bandwidth of the RTC session. In this way, embodiments may determine whether minimal requirements of a new or 3rd party algorithm for reliable processing results are fulfilled. The user calling the algorithm may then be informed, so that appropriate action can be taken. For instance, cameras may not be of adequate quality for certain algorithm(s). If it is detected that the resolution is too low, appropriate feedback can be provided. If bandwidth is limited, quality of video/audio might degrade. For example, a message may be provided to inform a user. A specification of minimal requirements may be included in the 'wrapper' to allow embodiments to detect limitations.

Innovation Rack Manager (IRM)

The Innovation Rack Manager (IRM) is configured to hosting available algorithms along with their wrapper and information about (minimal) requirements. The IRM may thus be thought of as a host of a set of available algorithms. An algorithm may be requested from the IRM and added to a RTC session as a participant. The IRM may be hosted in the cloud or on-premise.

Adding an Algorithm as a Virtual Participant

Embodiments may be configured to leverage functionality of existing RTC systems in order to add an algorithm to a RTC session as a (virtual) participant. Such proposed approaches may allow application logic to define and control which streams the algorithm(s) can access and where the results of the algorithm(s) should be presented. For instance, an API may be used which allows this to be specified when triggering or requesting an algorithm. Algorithms may be dynamically added/removed to/from a RTC session as desired by treating the algorithms as virtual participants of the RTC session. Basic/conventional functionality of the RTC system may be used for this purpose.

Figure 2:
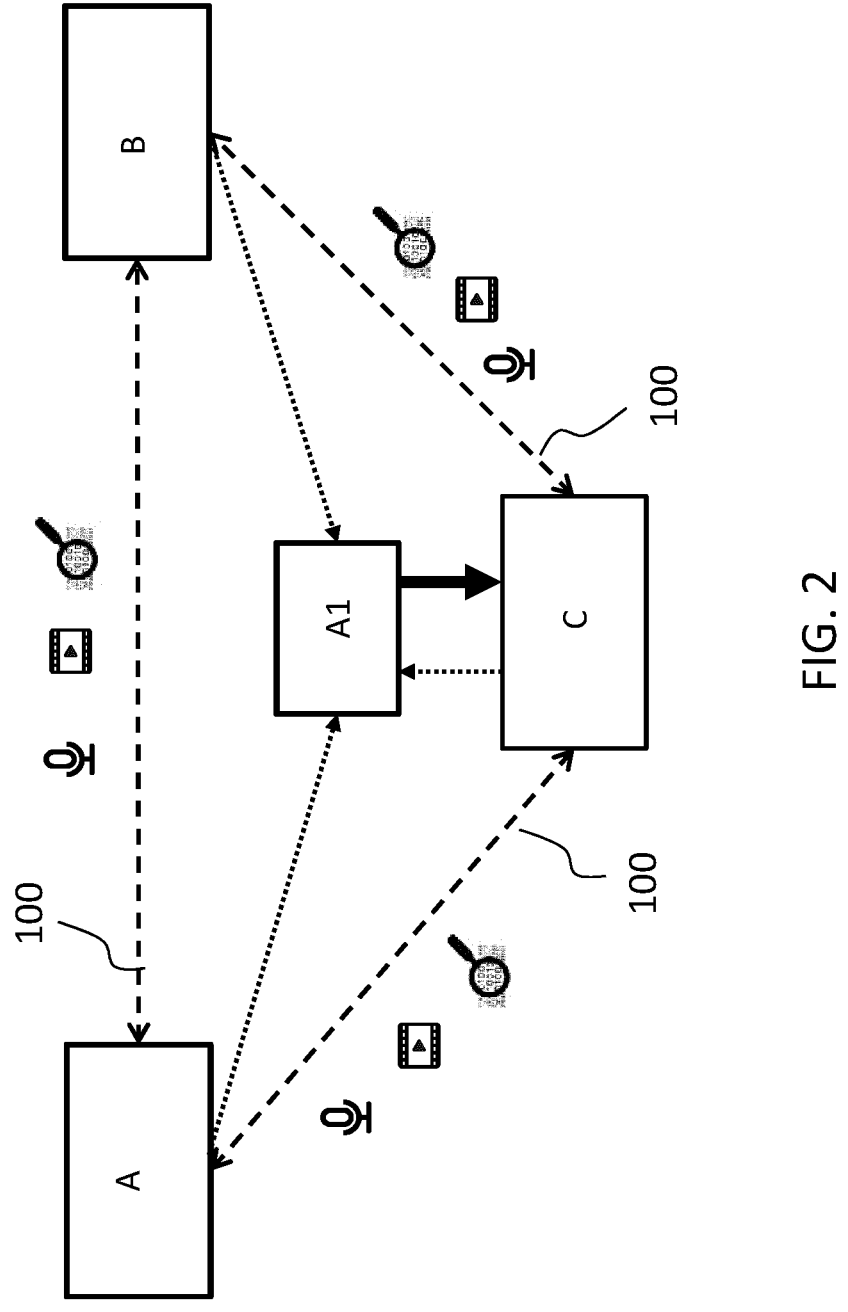
FIG. 2 is a simplified illustration of an exemplary embodiment wherein a first algorithm is added to a multi-party RTC session.

By way of example, FIG. 2 is a simplified illustration of an exemplary embodiment wherein a first algorithm A1 is added to a multi-party RTC session. Here, the RTC session has first A, second B and third C participants. Duplex communication links 100 between the first A, second B and third C participants communicate audio, video and data streams (as depicted by the symbols in FIG. 2).

The first algorithm A1 is added to the RTC session as a (virtual) participant.

As depicted by the dotted arrows, the first algorithm A1 is configured to receive inputs from the first A, second B and third C participants.

As depicted by the solid, bold arrow, the first algorithm A1 is configured to communicate its output(s) to the third participant C only.

Figure 3:
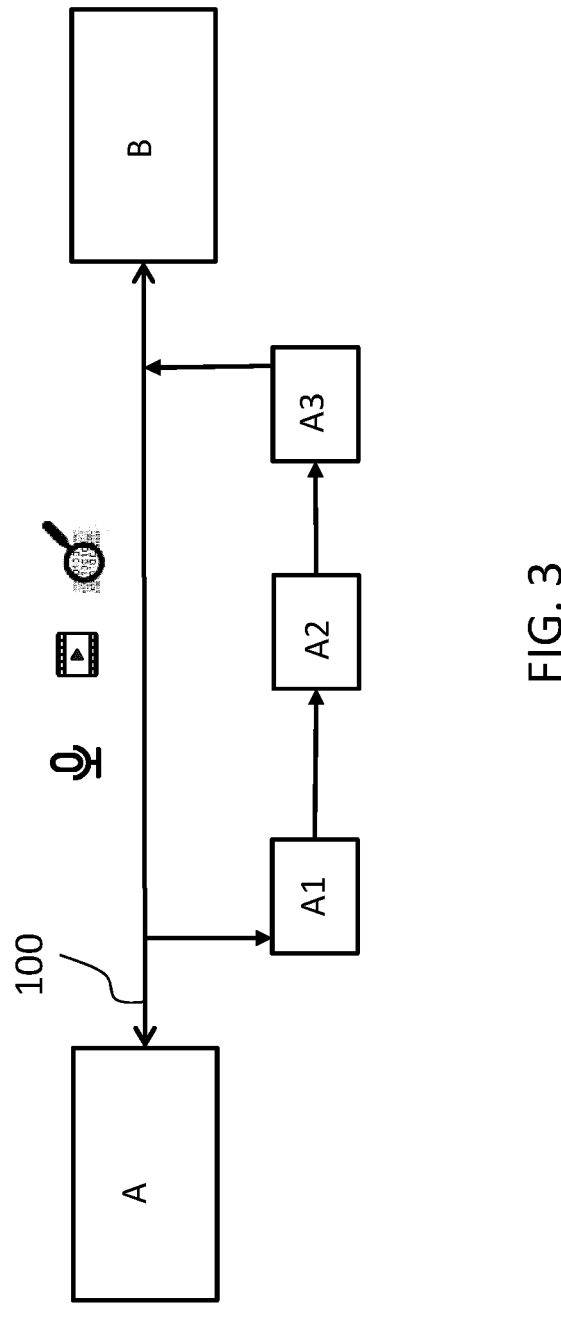
FIG. 3 is a simplified illustration of an exemplary embodiment that employs chaining of algorithms.

By way of further example, FIG. 3 is a simplified illustration of an exemplary embodiment that employs the chaining of algorithms, where algorithms use the output of a previous algorithm before feeding the result back to a participant of the call.

Here, the RTC session has first A and second B participants. A duplex communication link 100 between the first A and second B participants communicates audio, video and data streams (as depicted by the symbols in FIG. 3).

The first A1, second A2 and third A3 algorithms are added to the RTC session as (virtual) participants.

As depicted by the arrows of FIG. 3, the first algorithm A1 communicates its output(s) to the second algorithm A2, and the second algorithm A2 communicates its output(s) to the third algorithm A3. The third algorithm A3 communicates its output(s) back to the participants of the RTC session.

Figure 4:
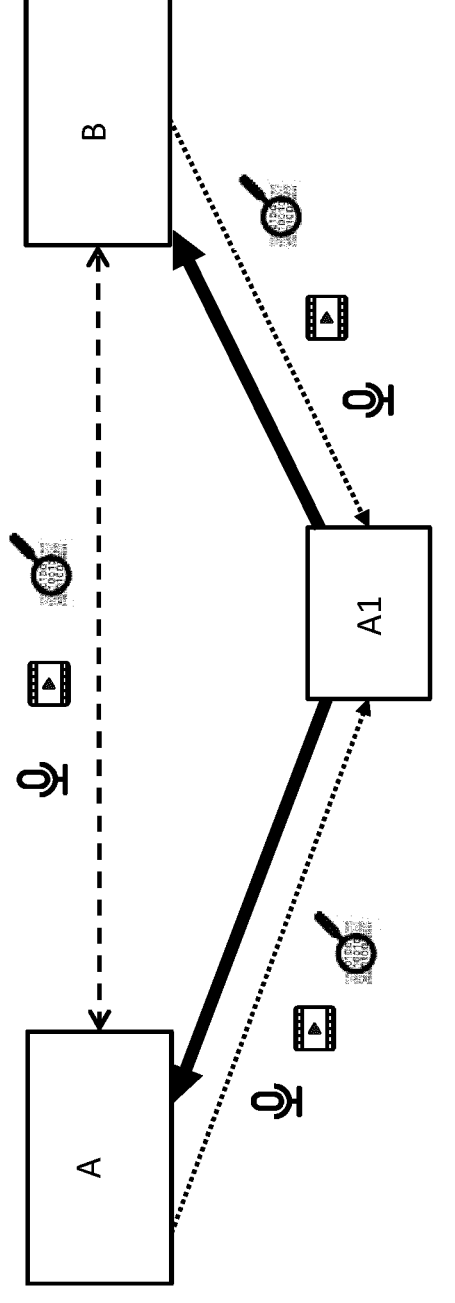
FIG. 4 is a simplified diagram of an exemplary embodiment wherein a first algorithm is added to a RTC session as a (virtual) participant.

After being added to a RTC session, an algorithm will be represented as additional (virtual) participant. An illustration of this proposed concept is provided in FIG. 4. FIG. 4 is a simplified diagram of a first algorithm A1 added to a RTC session as a (virtual) participant.

In the example of FIG. 4, the RTC session has first A and second B participants, and the first algorithm A1 is added as a third participant.

As depicted by the dotted arrows, the first algorithm A1 is configured to receive inputs from the first A and second B participants. Consequently, the first algorithm A1 receives all data streams as potential input.

As depicted by the solid, bold arrows, the first algorithm A1 is configured to communicate its output(s) to the first A and second B participants.

Adding Algorithms

Participants of a RTC session can add algorithm(s). For example, a participant may trigger or request an algorithm by submitting a request message in the RTC session. The request message is detected by a component of the IRM which then identifies the requested algorithm and adds the requested algorithm as a virtual participant of the RTC session.

Figure 5:
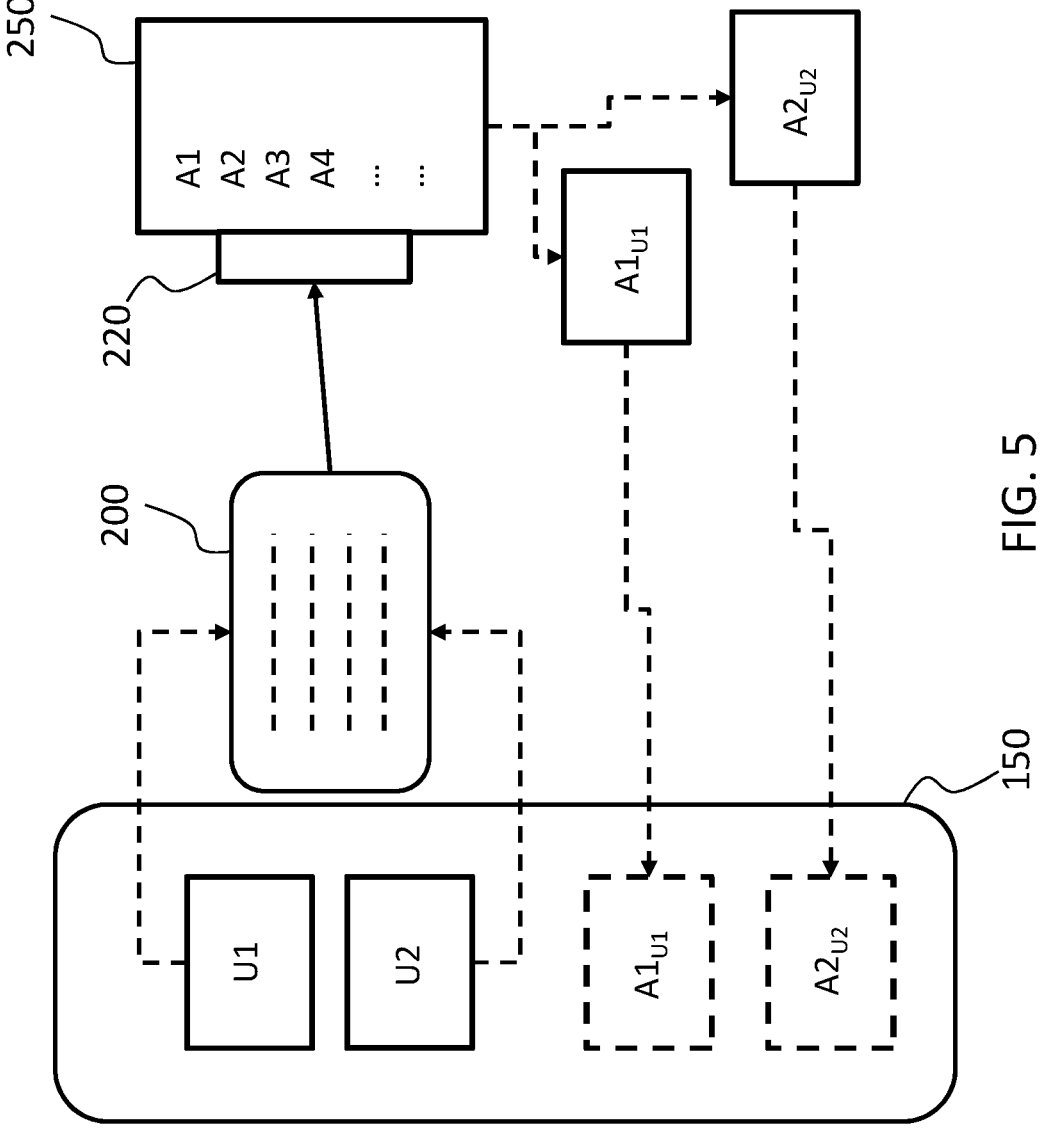
FIG. 5 is a simplified representation of adding first and second algorithms to a RTC session according to an embodiment.

An example of this process is illustrated in FIG. 5, which comprises a simplified representation of adding first and second algorithms to a RTC session according to an embodiment.

First U1 and second U2 users are participants of a RTC session 150. In this example, the RTC session comprises a live discussion in which the first U1 and second U2 users participate in a real-time discussion by typing content into a discussion/chat application 200. In other embodiments, audio/video/data streams may also be provided between the first U1 and second U2 users.

A monitoring component 220 of the IRM 250 monitors the content of the discussion/chat application 200 so as to identify requests for algorithms.

In the example depicted by FIG. 5, the monitoring component 220 identifies that the first user U1 requests a first algorithm A1. Responsive to this, the IRM 250 generates an instance $A1_{U1}$ of the first algorithm for the first user and adds the instance $A1_{U1}$ of the first algorithm for the first user as a participant of the RTC session 150. In this example, the monitoring component 220 also identifies that the second user U2 requests a second algorithm A2. Responsive to this, the IRM 250 generates an instance $A2_{U2}$ of the second algorithm for the second user and adds the instance $A2_{U2}$ of the second algorithm for the second user as a participant of the RTC session 150.

After joining a RTC session, a new participant may receive all streams that are currently available in the RTC session. To start processing, a second message can be sent to specify which of the streams shall be processed by the algorithm and where the results shall be displayed.

As mentioned above, an algorithm wrapper can be employed to enable use and compatibility of existing $3^{rd}$-party algorithms (which may be offered in the cloud for example). The wrapper can specify the type(s) of input and output for an algorithm and any requirements of the algorithm (e.g. connection quality, speed requirements, memory space, etc.).

By way of example, the wrapper may be represented in a tabular format such as Table 1 below.

TABLE 1

| #ID | Name | Input | Output | Bandwidth |
|---|---|---|---|---|
| #1002 | Alg1 | Video: VP8 | Data: text | 260 kbit/s |
| #1099 | Alg2 | Video: H.264 | Data: text | 400 kbit/s |
| . . . | . . . | . . . | . . . | . . . |
| . . . | . . . | . . . | . . . | . . . |
| . . . | . . . | . . . | . . . | . . . |

From the description above, it will be understood that proposed embodiments may be employed in conjunction with convention RTC systems so as to facilitate dynamic enhancement and/or flexible usage of algorithms. By way of example, $3^{rd}$-party developers of IRM algorithms may create Dynamic Link Library (DLL) files which, when added to their IRM deployment, provide the ability to include the algorithm to a RTC session as a participant.

Embodiments may, for example, be used in a wide range of real-time communication systems and methods. Exemplary applications that have already been identified as potentially benefitting from the proposed concept(s) for dynamic modification of functionality of a RTC session include: customer service support; real-time consultations between physician-patient; environment monitoring (e.g. patient monitoring and elderly care); health self-assessment applications and video monitoring applications (e.g. baby monitoring, remote video access, etc.).

From the above description, it will be understood that there is proposed a system that generates flexible and adaptive RTC systems that may dynamically adjust functionality. Such a system may automatically add, remove and/or modify algorithms as a participant of a RTC session so as to adjust available functionality.

Figure 6A:
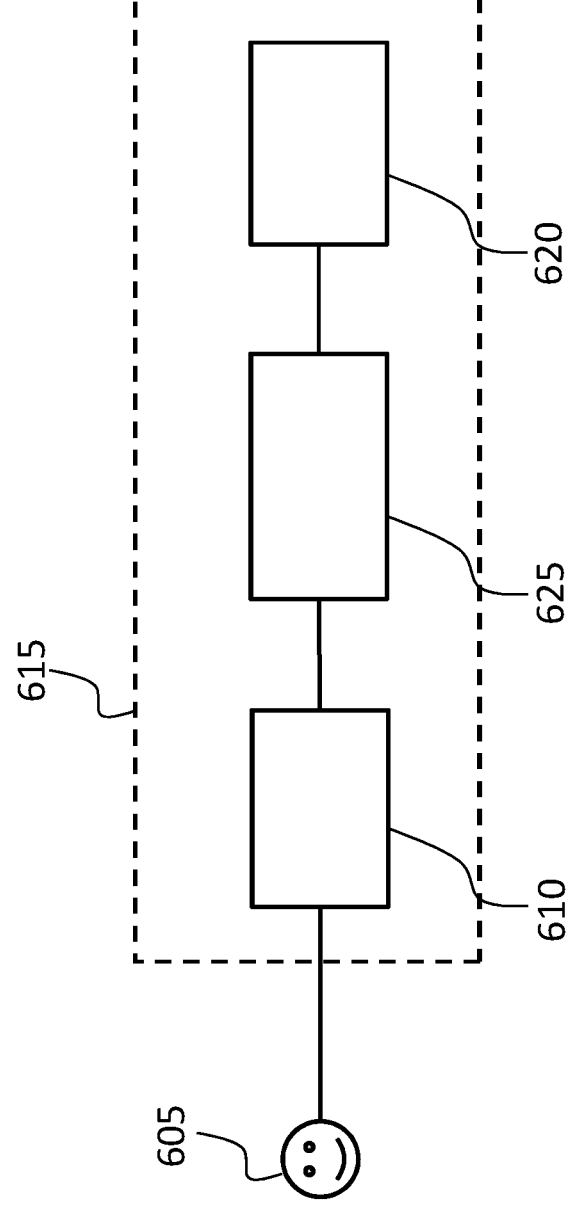
FIG. 6A and FIG. 6B depict exemplary approaches to including an algorithm as a virtual participant of a RTC session according to proposed embodiments.
Figure 6B:
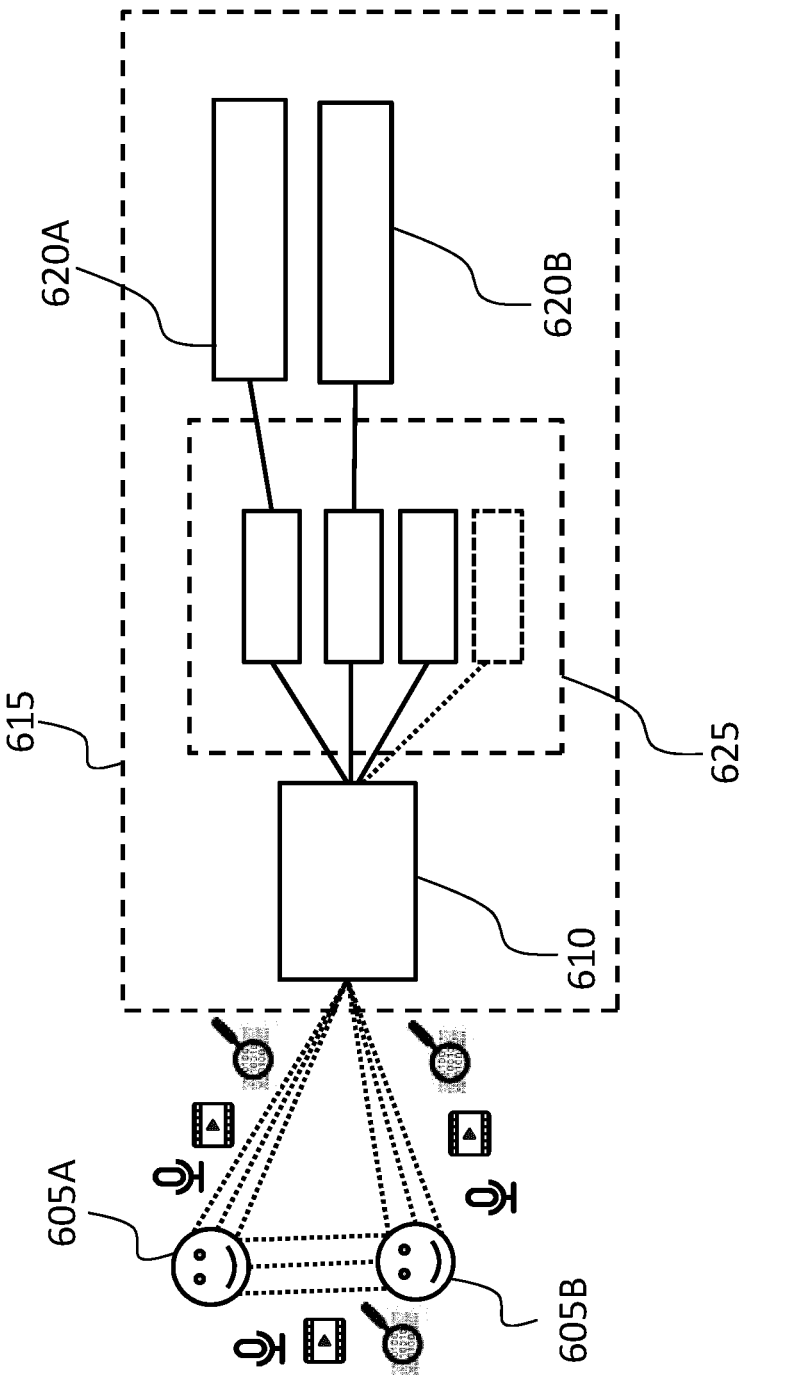

Referring now to FIGS. 6A and 6B, exemplary approaches to including an algorithm as a virtual participant of a RTC session are shown. More specifically, FIG. 6A depicts how an algorithm is included as a (virtual) participant of a RTC session that has a single human participant. FIG. 6B depicts how an algorithm is included as a (virtual) participant of a RTC session that has two human participants.

Referring to FIG. 6A, a human participant 605 connects to a headless client 610 of an IRM 615. The headless client 610 connects to an algorithm 620 via a wrapper 625. The wrapper 625 feeds data from the RTC session to the algorithm 620. The wrapper 625 also feeds data from algorithm 620 to RTC session. For this purpose, the wrapper 625 may use an API. However, in some embodiment, the wrapper 625 may not use an API.

Referring to FIG. 6B, first 605A and second 605B human participants of a RTC session connect to a headless client 610 of an IRM 615. The headless client 610 connects to first 620A and second 620B algorithms via a wrapper 625. Here, the first algorithm 620A provides a cloud-based service, and the second algorithm 620B provides C++ motion detection algorithm. The wrapper 625 employs various components (including API, C++, Matlab, etc. components) for feeds data to and from the algorithms 620A and 620B.

Figure 7:
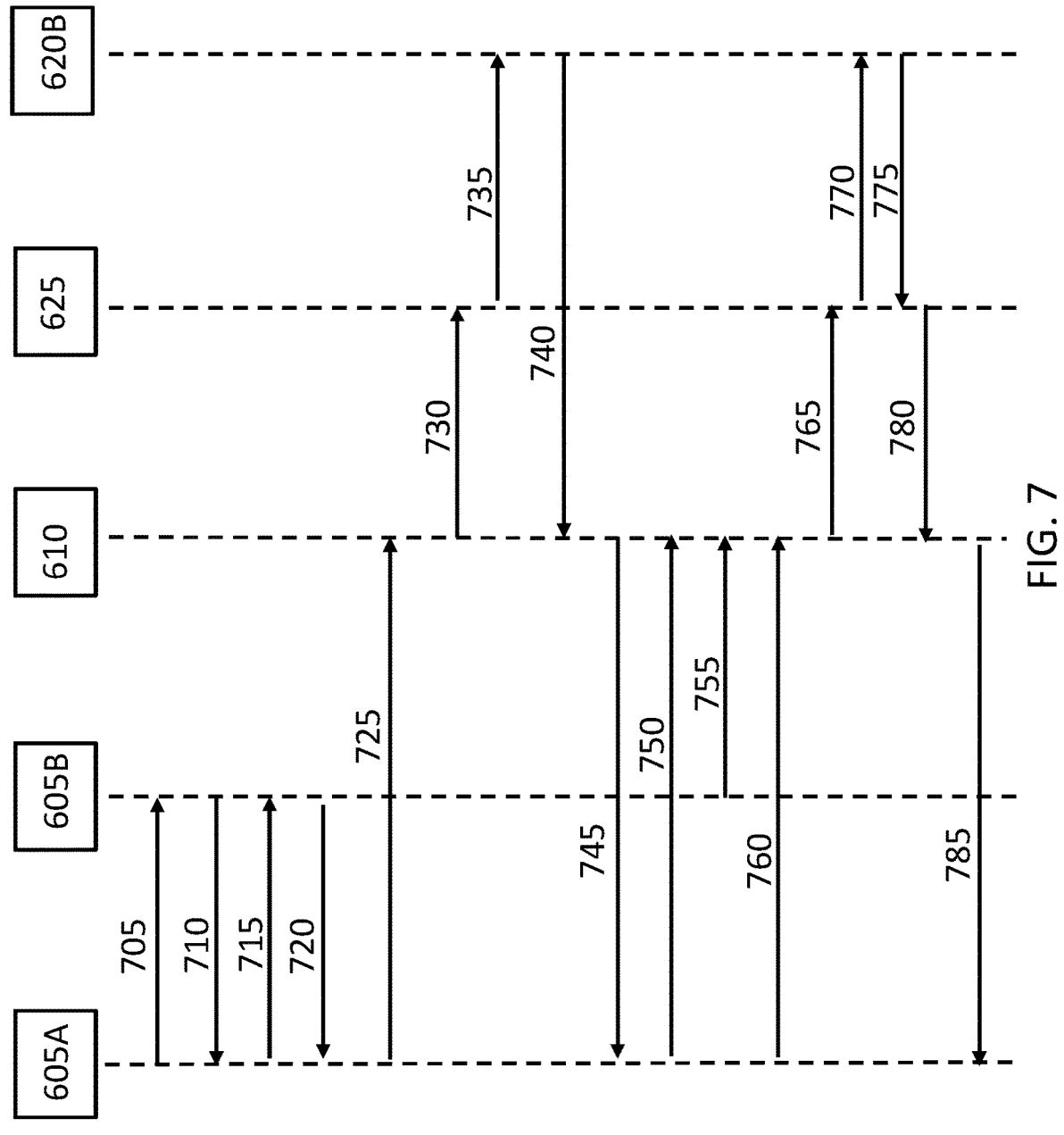
FIG. 7 is a sequence chart illustrating exemplary interactions between the components of FIG. 6B according to a proposed embodiment.

Referring now to FIG. 7 there is depicted a sequence chart illustrating exemplary interactions between the components of FIG. 6B.

In the exemplary sequence of FIG. 7, the following sequence of steps is undertaken:

705—the first user/participant 605A invites the second user 605B to participate in the RTC session.

710—The second user 605B then responds and joins the RTC session as a second participant.

715 & 720—Audio, video and data streams are sent between the first 605A and second 605B participants.

725—The first user/participant 605A requests/invites a motion detection algorithm 620B to join the RTC session by sending an invite/request to the headless client 610.

730—The headless client 610 then creates an algorithm instance by calling the algorithm wrapper 625.

735—The algorithm wrapper 625 creates an API connection to the motion detection algorithm 620B.

740—In instance of the motion detection algorithm 620B is created and provided to the headless client 610.

745—The headless client 610 adds the motion detection algorithm 620B as a participant of the RTC session.

750 & 755—Audio, video and data streams are sent from the first 605A and second 605B participants to the headless client 610.

760—The first user/participant 605A requests use of the motion detection algorithm 620B to analyse motion of the second user/participant 605B.

765—The headless client 610 passes captured video frames of the second user/participant 605B to the motion detection algorithm 620B via the wrapper 625.

770—The captured video frames of the second user/participant 605B are passed to the motion detection algorithm 620B and analyzed.

775—Results of the motion analysis are provided to the wrapper 625 by the motion detection algorithm 620B.

780—Results of the motion analysis are provided from the wrapper 625 to the headless client 610 as a data stream.

785—The results of the motion analysis are provided from the headless client 610 to the first user/participant 605A as a data stream.

It is also proposed that the concept(s) for modifying the functionality of a RTC session may be leveraged to supplement a face-to-face interaction (e.g. an in-person meeting of multiple persons at the same location). In this way, additional functionality may be provided to one or more participants of a face-to-face meeting, and the addition of such functionality may be achieved dynamically during the meeting. In particular, there is provided an approach for enabling the dynamic provision of the functionality to a face-to-face interaction via a RTC session. For instance, a RTC session may be established to accompany a face-to-face interaction and then the RTC session may be used to dynamically provide functionality for participants of the face-to-face interaction.

Such proposals may thus facilitate simple and intuitive addition, removal or modification of functionality to a face-to-face meeting of individuals, wherein the functionality is provided via a RTC session. This addition, removal or modification of functionality may for example be done in consideration of a context and/or events of the face-to-face meeting.

Embodiments of the present invention are therefore directed toward enabling the functionality of a face-to-face interaction of individuals to be modified, extended and/or improved in real-time (i.e. during the face-to-face interaction). Further, embodiments may be aimed at enabling the provision of relevant or important functionality at appropriate timing during a face-to-face interaction of individuals. Embodiments may therefore assist in clinical support assessment, medical diagnosis and/or support planning for example. By way of example only, illustrative embodiments may be utilized in many different types of clinical, medical or subject-related environments, such as a hospital, doctor's office, ward, care home, person's home, etc.

In particular, the inventors have realized that face-to-face interactions may leverage the proposed concepts for dynamic modification of RTC session functionality in order to provide improved or extended functionality for the face-to-face interaction. In particular, by establishing a RTC session for providing functionality to a face-to-face interaction and then employing proposed embodiments for modifying the functionality of a RTC session, functionality provided to the face-to-face interaction may be dynamically controlled and modified so as to improve the face-to-face interaction.

Such proposals may therefore facilitate the use of additional functionality during a face-to-face communication situation. Such functionality may be of particular interest in a clinical context, such as a physician-subject consultation wherein various activities may be undertaken as matter of routine (such as: monitoring of vital signs; visual inspection of the subject; transcription of audio; translation; voice analysis; emotion detection; recording a summary of the consultation; etc.). This additional functionality may be added to a live RTC session in controlled and/or dynamic manner, e.g. via voice command, via a gesture command; by typing an input via an input interface; or automatically upon detection of an event.

By way of example, a device may be provided at the location of the face-to-face interaction, wherein the device implements a proposed embodiment of a system for dynamic modification of functionality of a RTC session. The device may therefore act as a 'gateway' to additional functionality, wherein the functionality is provided by algorithms which can either be hosted locally or somewhere in the cloud. The algorithms can perform processing on audio/video/data stream(s) obtained from the face-to-face interaction and results can be stored and/or be presented to one or more of the participant(s), e.g. on a computing device of the participant and/or on a display device provided at the location of the face-to-face interaction.

It will therefore be appreciated that proposed embodiments may provide concepts for supplementing a face-to-face interaction (e.g. an in-person meeting) with additional functionality/algorithms that process any or all of 'audio/video/data' available from participants in the face-to-face interaction. Such face-to-face interactions may include multiple participants.

Figure 8:
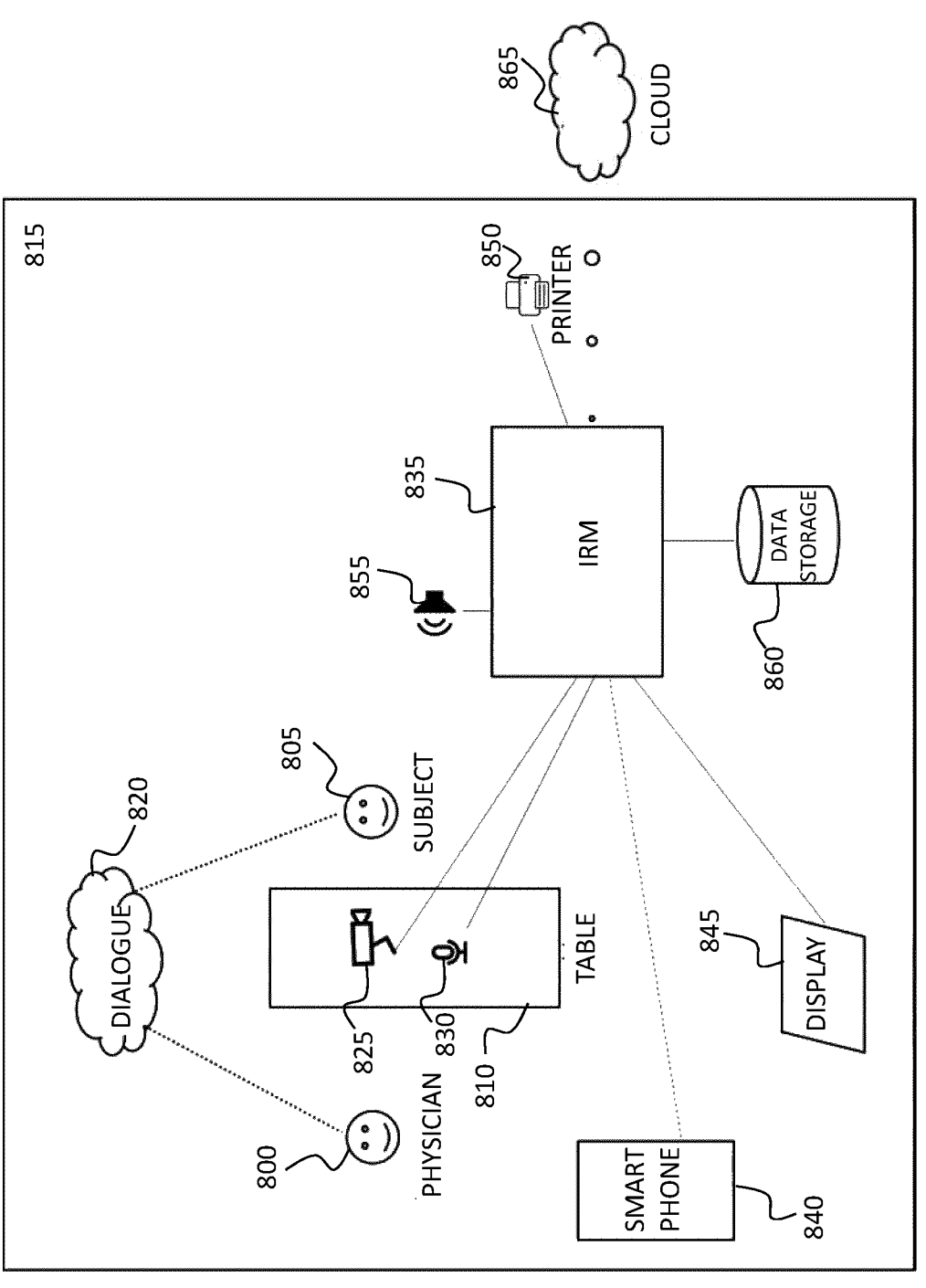
FIG. 8 is a simplified illustration of an exemplary embodiment that facilitates the addition, removal or modification of functionality to a face-to-face meeting between a physician and a subject.

Referring now to FIG. 8, an exemplary approach to supplementing a face-to-face interaction (e.g. an in-person meeting) with additional functionality/algorithms is shown. More specifically, FIG. 8 is a simplified illustration of an exemplary embodiment that employs an RTC session to facilitate the addition, removal or modification of functionality to a face-to-face meeting between a physician and a subject.

As depicted in FIG. 8, a physician 800 and a subject 805 are situated on opposite sides of a table 810 within a consultation room 815. The physician 800 and subject 805 thus partake in a face-to-face interaction (i.e. face-to-face meeting) and, in doing so, a spoken dialogue between the physician 800 and subject 805 is created.

Provided on the table is a video camera 825 and microphone 830. The video camera 825 is arranged to capture video footage of the subject 805, and the microphone 830 is configured to capture the sound of the spoken dialogue between the physician 800 and subject 805. In this way, audio and video data of the face-to-face interaction is obtained.

The obtained audio and video data of the face-to-face interaction is provided to an IRM 830 via one or more appropriately arranged communication links (e.g. wireless, wired or short-range communication link). The IRM 835 is also communicatively coupled with various devices provided in the consultation room 815 (e.g. via one or more wireless, wired or short-range communication links). Purely by way of example, the devices in this example include, a smart phone 840, a display device 845, a printer 850, a speaker 855, and a data storage device 860. Furthermore, the IRM 835 is also communicatively coupled with cloud-based communication and/or processing resources (e.g. the Internet) 865.

It will therefore be appreciated that a wide range of devices and/or computing resources may be used to input data to the IRM 835 and/or output data from the IRM in various forms. For instance, the IRM 835 may employ algorithms/functionality residing in the cloud 865 and/or may output results via the display device 845 for viewing by both the physician 800 and the subject. 805.

The system establishing a RTC session for providing at least one functionality to the face-to-face interaction. A monitoring component (not shown) of the IRM 835 then monitors the content of the dialogue 820 and input signals from the video camera 825 and the smart phone 840 so as to identify requests for algorithms. For example, the physician 300 can request the addition of functionality (e.g. a breathing analysis algorithm) via a spoken command (e.g. by speaking a 'KEYWORD' name of algorithm followed by 'start') and/or via performance of a pre-determined gesture and/or via typing/selecting the desired functionality via the smartphone 840.

Responsive to identifying a request for an algorithm, the IRM 835 generates an instance of the algorithm and adds the instance of the algorithm as a participant of the RTC session. The IRM 835 machine also provides a feedback to signal via the smart phone 840 and/or the speaker 855 indicating that the algorithm has been started.

Similarly, removal of functionality can be undertaken via a spoken command (e.g. by speaking a 'KEYWORD' name of algorithm followed by 'stop') and/or via performance of a pre-determined gesture and/or via typing/selecting the desired functionality via the smartphone 840. Responsive to identifying a request for removal of an algorithm, the IRM 835 removes the instance of the algorithm as a participant of the RTC session. The IRM 835 machine also provides a feedback to signal via the smart phone 840 and/or the speaker 855 indicating that the algorithm has been stopped.

Additional functionality for the face-to-face interaction is thus provided by the IRM 835, which is present in the room 815. The IRM 835 may be entirely local (i.e. on-premise) or might leverage remote (i.e. off-premise) resources.

In some embodiments, it may be preferable to perform some system configuration(s) to account for the specific characteristics or properties of the face-to-face interaction. For example, in the physician-subject consultation example above, it may be useful to define the seating locations for the physician and the subject, so that the appropriate video stream is processed by an algorithm. Similarly, the microphone arrangement may be configured to distinguish audio from subject and audio from physician.

Instead of defining the seating locations manually, embodiments may be trained to recognize the physician's voice and face. Such systems may then discover who is located where in the room and which audio/video should be processed by an algorithm.

Further, some embodiment may be configured to only permit the physician to request additional functionality during a face-to-face consultation. This may help to avoid misuse of the system.

It may also be preferable to facilitate context-based triggering of functionality. For instance, algorithm selection may be defined by the context of the consultation. In this way, an algorithm may be triggered by: a manual trigger (e.g. by an administrator); an automatic trigger (e.g. dependent on process step); or a context-sensitive trigger.

By way of example, the physician may know in advance the type of consultation he/she will be conducting. In each of various types of consultation, the physician may follow a predefined set of steps, which can be linked to a specific algorithm the system might offer to run. The system might offer a "context sensitive" menu or some other form of hint/prompt to the physician based on a consultation selection provided by the physician prior to the consultation. Further, embodiments may track consultation progression over time and automatically change the menu selection or prompts depending on elapsed time.

Embodiments may be configured to leverage the proposed concept of adding an algorithm to a RTC session as a (virtual) participant. In particular, it is proposed to use a RTC session to enrich a face-to-face interaction. For instance, an RTC session may be established to accompany a face-to-face interaction, and the RTC session may then employ proposed concepts to dynamically add and/or remove algorithms that may enrich the face-to-face interaction.

By way of further example, an exemplary approach to supplementing a face-to-face interaction (e.g. an in-person meeting) with additional functionality/algorithms is shown, wherein the room hosting the face-to-face meeting of a physician and a subject is made a participant of a RTC session.

Figure 9:
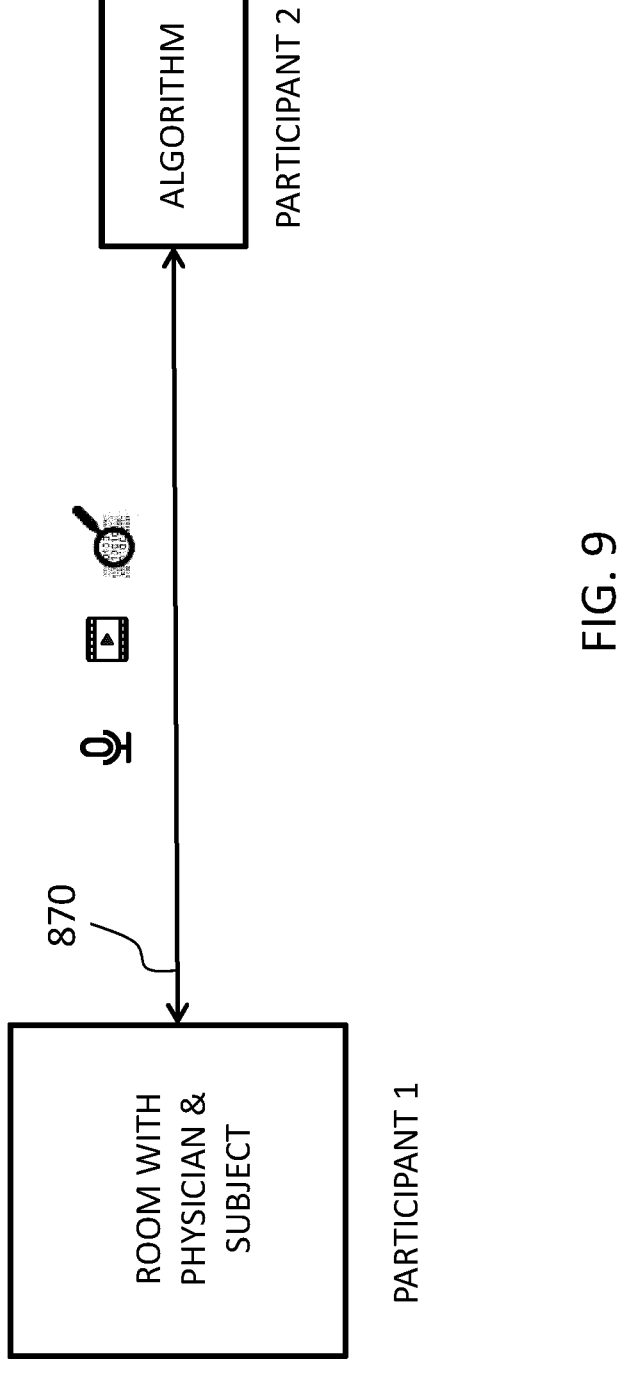
FIG. 9 is a simplified diagram of a RTC session according to another exemplary embodiment.

More specifically, FIG. 9 is a simplified diagram of a RTC session according to an exemplary embodiment, wherein the RTC session has first and second participants (namely PARTICIPANT-1 and PARTICIPANT-2, respectively). Here, the RTC session is established to accompany a face-to-face consultation of a physician-subject in a private consultation room. In accordance with proposed concepts, the RTC session is established for providing at least one functionality to a participant of the face-to-face interaction. A duplex communication link 870 between the first and second participants communicates audio, video and data streams (as depicted by the symbols in FIG. 9).

The people in the consultation room (namely the physician and subject) are made a single, first participant PARTICIPANT-1 of the RTC session. In this way, all participants of the face-to-face consultation are represented as a single participant of the RTC session. Algorithms can then be dynamically added/removed during the face-to-face interaction as desired (according to proposed concepts detailed above). In this way, algorithms are treated as virtual participants of the RTC session, i.e. when an algorithm is requested for enriching the face-to-face interaction, the algorithm is added as a virtual participant to the RTC session. For example, FIG. 9 depicts an algorithm added to the RTC session as a second participant PARTICIPANT-2.

In this way, during the face-to-face interaction, an algorithm/functionality can be added to process audio/video or data from the face-to-face interaction. Several algorithms/ functionalities can be used during different periods of the face-to-face interaction or at the same time.

As an alternative to making all of the people in the consultation room a single participant of an RTC session, each participant of the face-to-face interaction may be made a separate (virtual) participant of a RTC session. Such an approach is illustrated in FIG. 10.

Figure 10:
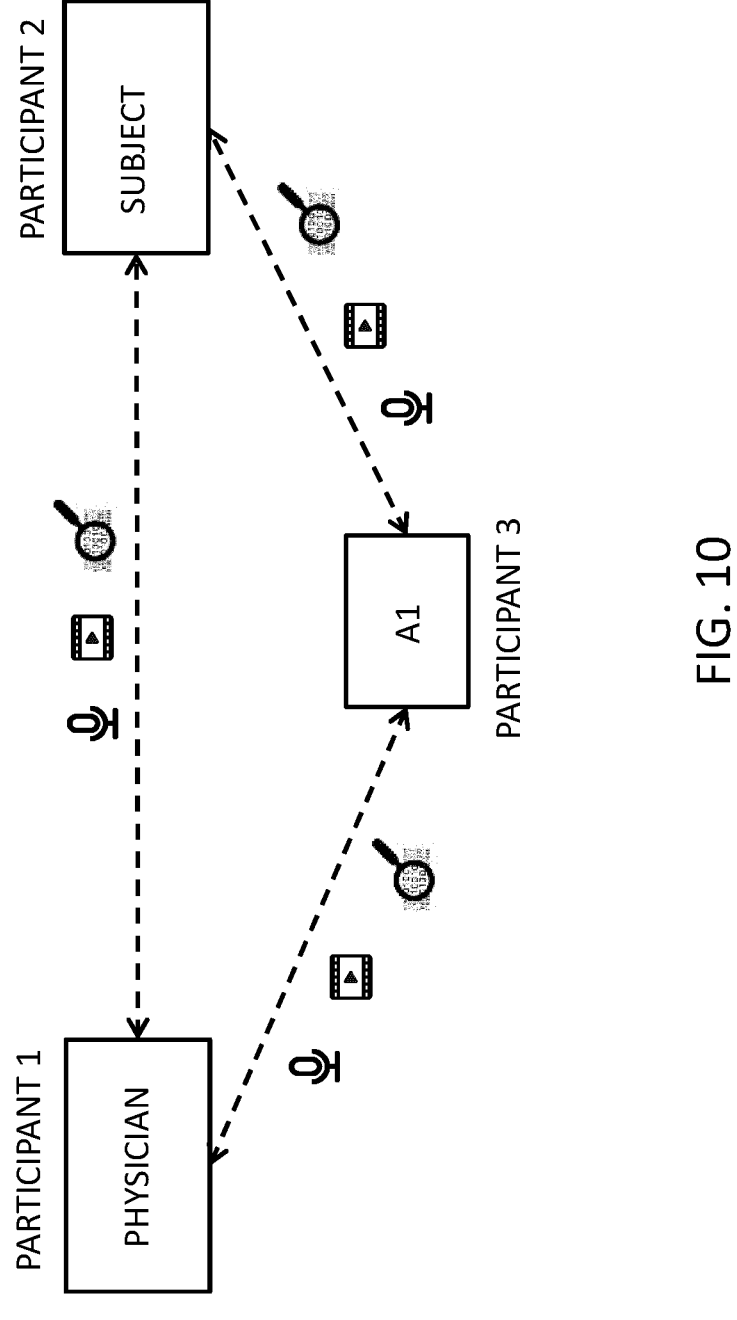
FIG. 10 is a simplified diagram of an exemplary embodiment for a face-to-face meeting between a physician and a subject, wherein the physician and subject are first and second participants of a RTC session, respectively, and wherein a first algorithm is added to a RTC session as a (virtual) participant.

More specifically, FIG. 10 is a simplified illustration of an exemplary embodiment wherein each participant of a face-to-face interaction is made a separate participant of a RTC session that is established for providing at least one functionality to the face-to-face interaction. Here, the physician and subject are made first and second participants (namely PARTICIPANT-1 and PARTICIPANT-2, respectively).

Algorithms can then be dynamically added/removed during the face-to-face interaction as desired (according to proposed concepts detailed above). For example, FIG. 10 depicts an algorithm added to the RTC session as a third participant PARTICIPANT-3.

From the above description, it will be understood that there are proposed concepts for facilitating the addition/ removal of functionality to a face-to-face interaction. Such concepts may be based on the idea that, when a face-to-face interaction is established, an accompanying RTC session can be established for providing functionality to the face-to-face interaction. Responsive to an algorithm being activated, it is added as participant to the RTC session. This approach to adding/removing processing algorithms to a RTC session has the same dynamics as adding/removing 'normal' participants.

Also, per available participant of the RTC session, available or applicable data types may be specified. Similarly, it can be specified which output should be presented to which participant, and/or what should happen with the results.

Although examples have been described above with reference to interactions between a physician and a subject (e.g. patient), it is to be understood that the proposed concepts may be applicable to other interactions. For example, embodiments may relate to home monitoring application, where family members request the functionality provided by one or more algorithms in order to measure vital signs. Other embodiments may relate to work/office-related meetings, where participants may request functionality provided by one or more algorithms to automatically create documents, generate meeting minutes, establish voting results, etc.

Figure 11:
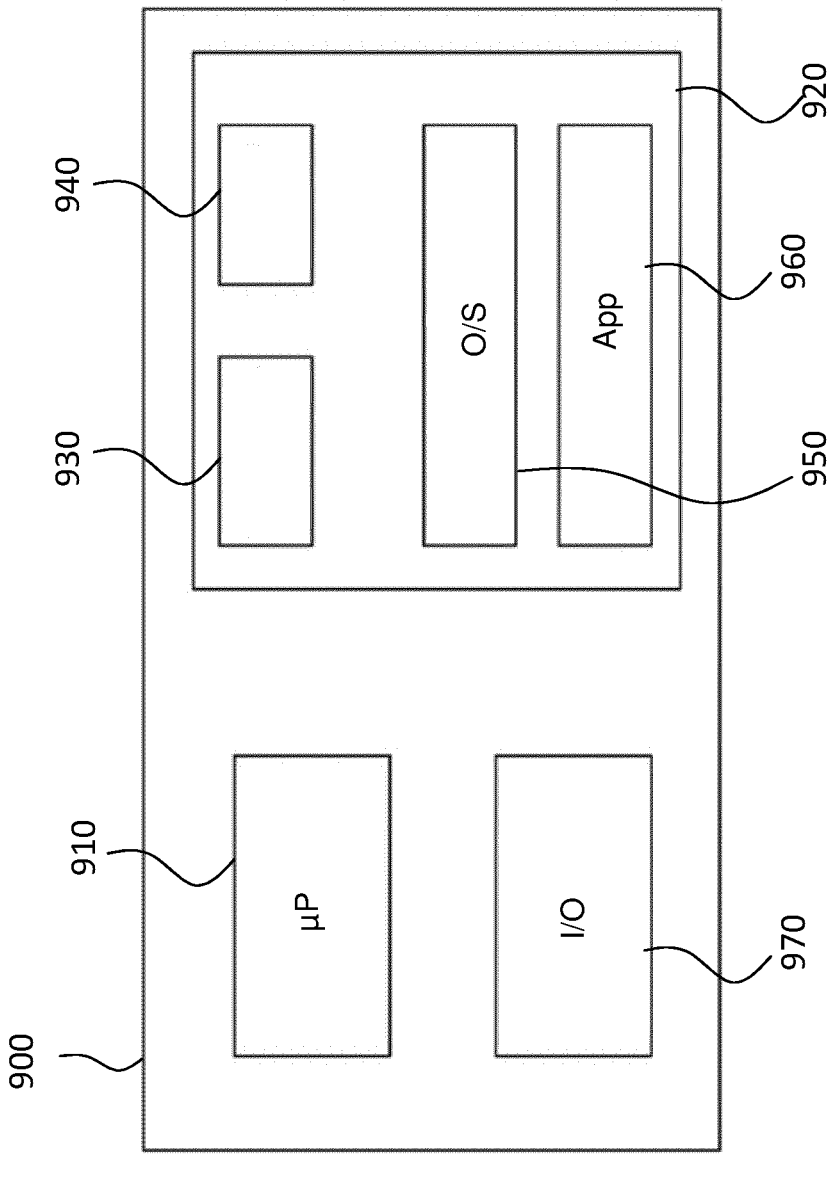
FIG. 11 is a simplified block diagram of a computer within which one or more parts of an embodiment may be employed.

FIG. 11 illustrates an example of a computer 900 within which one or more parts of an embodiment may be employed. Various operations discussed above may utilize the capabilities of the computer 900. For example, one or more parts of a system for providing a subject-specific user interface may be incorporated in any element, module, application, and/or component discussed herein. In this regard, it is to be understood that system functional blocks can run on a single computer or may be distributed over several computers and locations (e.g. connected via internet).

The computer 900 includes, but is not limited to, PCs, workstations, laptops, PDAs, palm devices, servers, storages, and the like. Generally, in terms of hardware architecture, the computer 900 may include one or more processors 910, memory 920, and one or more I/O devices 970 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 910 is a hardware device for executing software that can be stored in the memory 920. The processor 910 can be virtually any custom made or commercially available processor, a central processing unit (CPU), a digital signal processor (DSP), or an auxiliary processor among several processors associated with the computer 900, and the processor 910 may be a semiconductor based microprocessor (in the form of a microchip) or a microprocessor.

The memory 920 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 920 may incorporate electronic, magnetic, optical, and/or other types of storage media. Note that the memory 920 can have a distributed architecture, where various components are situated remote from one another, but can be accessed by the processor 910.

The software in the memory 920 may include one or more separate programs, each of which comprises an ordered listing of executable instructions for implementing logical functions. The software in the memory 920 includes a suitable operating system (O/S) 950, compiler 940, source code 930, and one or more applications 960 in accordance with exemplary embodiments. As illustrated, the application 960 comprises numerous functional components for implementing the features and operations of the exemplary embodiments. The application 960 of the computer 900 may represent various applications, computational units, logic, functional units, processes, operations, virtual entities, and/ or modules in accordance with exemplary embodiments, but the application 960 is not meant to be a limitation.

The operating system 950 controls the execution of other computer programs, and provides scheduling, input-output control, file and data management, memory management, and communication control and related services. It is contemplated by the inventors that the application 960 for implementing exemplary embodiments may be applicable on all commercially available operating systems.

Application 960 may be a source program, executable program (object code), script, or any other entity comprising a set of instructions to be performed. When a source program, then the program is usually translated via a compiler (such as the compiler 940), assembler, interpreter, or the like, which may or may not be included within the memory 920, so as to operate properly in connection with the O/S 950. Furthermore, the application 960 can be written as an object oriented programming language, which has classes of data and methods, or a procedure programming language, which has routines, subroutines, and/or functions, for example but not limited to, C, C++, C#, Pascal, BASIC, API calls, HTML, XHTML, XML, ASP scripts, JavaScript, FORTRAN, COBOL, Perl, Java, ADA, .NET, and the like.

The I/O devices 970 may include input devices such as, for example but not limited to, a mouse, keyboard, scanner, microphone, camera, etc. Furthermore, the I/O devices 970 may also include output devices, for example but not limited to a printer, display, etc. Finally, the I/O devices 970 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 970 also include components for communicating over various networks, such as the Internet or intranet.

If the computer 900 is a PC, workstation, intelligent device or the like, the software in the memory 920 may further include a basic input output system (BIOS) (omitted for simplicity). The BIOS is a set of essential software routines that initialize and test hardware at startup, start the O/S 950, and support the transfer of data among the hardware devices. The BIOS is stored in some type of read-only-memory, such as ROM, PROM, EPROM, EEPROM or the like, so that the BIOS can be executed when the computer 900 is activated.

When the computer 900 is in operation, the processor 910 is configured to execute software stored within the memory 920, to communicate data to and from the memory 920, and to generally control operations of the computer 900 pursuant to the software. The application 960 and the O/S 950 are read, in whole or in part, by the processor 910, perhaps buffered within the processor 910, and then executed.

When the application 960 is implemented in software it should be noted that the application 960 can be stored on virtually any computer readable medium for use by or in connection with any computer related system or method. In the context of this document, a computer readable medium may be an electronic, magnetic, optical, or other physical device or means that can contain or store a computer program for use by or in connection with a computer related system or method.

The application 960 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description has been presented for purposes of illustration and description, and is not intended to be exhaustive or limited to the invention in the form disclosed. Many modifications and variations will be apparent to those of ordinary skill in the art. Embodiments have been chosen and described in order to best explain principles of proposed embodiments, practical application(s), and to enable others of ordinary skill in the art to understand various embodiments with various modifications are contemplated. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention may be implemented by means of hardware comprising several distinct elements, and/or by means of a suitably programmed processor. In the device claim enumerating several means, several of these means may be embodied by one and the same item of hardware. Measures recited in mutually different dependent claims may advantageously be used in combination.

The invention claimed is:

1. A method for dynamic modification of functionality of a real-time communications session, the method comprising:
establishing the real-time communication session,
wherein the real-time communication session comprises a configuration,
wherein the configuration provides one or more functions to the real-time communication session;
identifying a request for a first algorithm of a set of algorithms,
wherein the set of algorithms provides a set of functions that are not included in the one or more functions provided to the real-time communication session by the configuration,
wherein each algorithm of the set of algorithms is configured to provide an associated function to the real-time communication session when executed during the real-time communication session; and
adding an instance of the first algorithm to the real-time communication session as a virtual participant,
wherein the virtual participant is enabled to receive input and provide output within the real-time communication session, but is otherwise independent of the real-time communication session, and
wherein adding the instance of the first algorithm as a virtual participant uses a same process as adding a non-virtual participant.

2. The method of claim 1, wherein adding the instance of the first algorithm to the real-time communication session as the virtual participant comprises:
calling the first algorithm via a container; and
configuring, by the container, the instance of the first algorithm as the virtual participant of the real-time communication session.

3. The method of claim 2, wherein calling the first algorithm via the container comprises communicating with the container via an interface.

4. The method of claim 1, wherein the request for the first algorithm comprises an indication of a requirement of the first algorithm,
and wherein adding the instance of the first algorithm to the real-time communication session as the virtual participant comprises:
configuring at least one of: an input and an output of the instance of the first algorithm based on the indication of the requirement of the first algorithm.

5. The method of claim 1, wherein each algorithm of the set of algorithms is associated with a respective wrapper that defines at least one of: an input; an output; and a requirement of the algorithm,
and wherein adding the instance of the first algorithm to the real-time communication session as the virtual participant comprises:
configuring at least one of: an input; an output of the instance of the first algorithm based on the wrapper associated with the first algorithm.

6. The method of claim 1, wherein identifying the request comprises determining the request for the first algorithm based on at least one of:
a user input signal provided by a participant of the real-time communication session;
a context of a data stream of the real-time communication session;
the occurrence of a predetermined trigger event; and
the occurrence of an un-predetermined trigger event.

7. A method for dynamic modification of functionality of a face-to-face interaction between first and second participants, the method comprising:
modifying a functionality of the real-time communication session according to claim 1, wherein the real-time communication session is established for providing at least one functionality to a participant of the face-to-face interaction.

8. The method of claim 7, wherein establishing the real-time communication session comprises:

adding the first and second participants of the face-to-face interaction as an other virtual participant of the real-time communication session.

9. The method of claim 7, wherein establishing the real-time communication session comprises:

adding the first participant of the face-to-face interaction as a first other virtual participant of the real-time communication session; and adding the second participant of the face-to-face interaction as a second other virtual participant of the real-time communication session.

10. The method of claim 7, wherein identifying the request comprises determining the request for the first algorithm based on at least one of:

a user input signal provided by a participant of the face-to-face interaction;

a context of a data stream of the face-to-face interaction;

the occurrence of an un-predetermined trigger event in the face-to-face interaction; and the occurrence of a predetermined trigger event in the face-to-face interaction.

11. The method of claim 1, wherein the real-time communication session is configured for exchange of clinical information for Clinical Decision Support.

12. The method of claim 1, wherein at least one algorithm of the set of algorithms is configured to store and/or retrieve data to/from an electronic medical record database when executed.

13. A non-transitory computer program product for dynamic modification of functionality of a real-time communications session, wherein the computer program product comprises a computer-readable storage medium having computer-readable program code embodied therewith, wherein the computer-readable program code is configured to perform all of the steps of claim 1.

14. A system for dynamic modification of functionality of a real-time communications session, the system comprising:

a communication circuit configured to establish the real-time communication session, wherein the real-time communication session comprises a configuration, wherein the configuration provides one or more functions to the real-time communication session;

a processing circuit configured to identify a request for a first algorithm of a set of algorithms, wherein the set of algorithms provides a set of functions that are not included in the one or more functions provided to the real-time communication session by the configuration, wherein each algorithm of the set of algorithms is configured to provide an associated function when executed during the real-time communication session; and a modification circuit configured to add an instance of the first algorithm to the real-time communication session as a virtual participant, wherein the virtual participant is enabled to receive input and provide output within the real-time communication session, but is otherwise independent of the real-time communication session, and wherein adding the instance of the first algorithm as a virtual participant uses a same process as adding a non-virtual participant.

15. A system for dynamic modification of functionality of a face-to-face interaction between first and second participants, the system comprising:

a system for dynamic modification of functionality of a real-time communications session, wherein the real-time communication session comprises a configuration, wherein the configuration provides one or more functions to the real-time communication session, wherein the dynamic modification of functionality of the real-time communication session comprises adding at least one additional function of the real-time communication session as a virtual participant for use by at least one of the first and second participants of the face-to-face interaction, wherein adding the at least one function as a virtual participant uses a same process as adding the at least one of the first and second participants, wherein the virtual participant is enabled to receive input and provide output within the real-time communication session, but is otherwise independent of the real-time communication session, and wherein the additional function is not one of the one or more functions provided by the configuration of the real-time communication session.

* * * * *